United States Patent [19]

Atzrott

[11] Patent Number: 4,624,427
[45] Date of Patent: Nov. 25, 1986

[54] PARACHUTE CANOPY REEFING TECHNIQUE

[75] Inventor: John E. Atzrott, Natick, Mass.

[73] Assignee: The United States of America as represented by the Secretary of the Army, Washington, D.C.

[21] Appl. No.: 808,963

[22] Filed: Dec. 16, 1985

[51] Int. Cl.$^4$ .............................................. B64D 17/36
[52] U.S. Cl. .................................................... 244/152
[58] Field of Search ............... 244/142, 145, 147, 149, 244/150, 152

[56] References Cited

U.S. PATENT DOCUMENTS

| | | | |
|---|---|---|---|
| 2,732,153 | 1/1956 | Frieder et al. | 244/150 |
| 3,362,664 | 1/1968 | McElroy | 244/147 |
| 3,506,225 | 4/1970 | Snyder . | |
| 3,615,156 | 10/1971 | Blain et al. . | |

FOREIGN PATENT DOCUMENTS

| | | |
|---|---|---|
| 748009 | 4/1956 | United Kingdom . |
| 747971 | 4/1956 | United Kingdom . |
| 776296 | 6/1957 | United Kingdom . |

Primary Examiner—Galen Barefoot
Attorney, Agent, or Firm—Lawrence E. Labadini; Mark Goldberg

[57] ABSTRACT

A reefing buffer, attached to one of a parachute's suspension lines, encircles all of the suspension lines. There is a pocket sewn onto the buffer which holds a cutter in place. A reefing line passes through the cutter and around the reefing buffer to be tied in place.

5 Claims, 2 Drawing Figures

PARACHUTE CANOPY REEFING TECHNIQUE

The invention described herein may be manufactured, used, and licensed by or for the Government for governmental purposes without the payment to me of any royalty thereon.

BACKGROUND OF THE INVENTION

This invention relates to reefed-typed parachutes, and more particularly to disreefing devices for parachutes using a reefing line to protect the parachute from the forces normally exerted against a parachute opening.

Parachute canopy reefing consists of restricting the mouth of the parachute, to a smaller diameter, usually by a reefing line, during the initial descent to limit the amount of air admitted to the canopy until it is safe to fully open the parachute. This action avoids an excessive buildup of pressure within the parachute which would otherwise cause canopy blowout and a total destruction of the parachute and its load.

Various types of disreefing devices have been designed to fully open the parachute at a predetermined event. Several different structures have been used to reef parachute canopies. In some parachutes, as illustrated in U.S. Pat. No. 3,047,261 a reefing line freely passes through rings along the canopy skirt and connected at its ends to a cutting device. An alternative to a reefing line around the canopy periphery is to install one around the rigging lines, with a severing means severing the reefing line at the desired time. Such a device is employed in U.K. Pat. No. 747,971 where rupturable bands or "reefing ties" are used to restrain the opening of the parachute.

SUMMARY OF THE INVENTION

The present invention provides improved parachute reefing over prior art devices.

A reefing buffer, attached to one of a parachute canopy's suspension lines, encircles all of the parachute suspension lines at a point between the parachute canopy and the load. The suspension lines may go to a link which goes in turn to the load. A pocket is sewn onto the cloth to hold a cutter in place. The last component of this assembly is a reefing line or cord which passes through the cutter and encircles the reefing buffer to be tied in place. The reefing buffer is held securely in place by the reefing line until the cutter functions. An alternate means for retaining the cutter in place may be used, such as a bracket.

DETAILED DESCRIPTION

This invention provides an improved method of restricting the opening of a parachute during the deployment phase while reducing the number of reefing lines required and the number of reefing line cutters. As few as a single reefing line cutter on a single reefing line will work to successfully restrict the parachute opening. In addition to the savings in material, a parachute packed according to this invention is simpler in operation than prior art parachutes. This serves to reduce the number of potential errors by the soldier repacking the parachute in the field.

Figure 1:
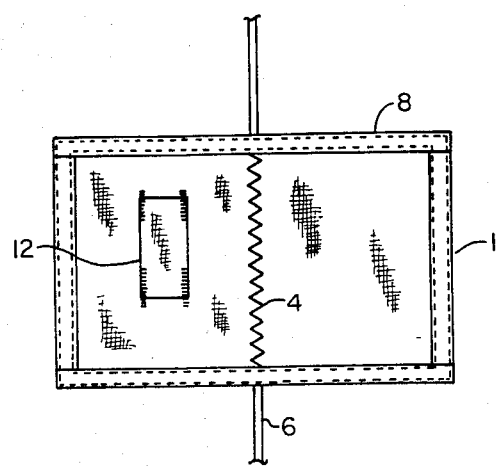
FIG. 1 shows a reefing line buffer cloth sewn to a single suspension line.
Figure 2:
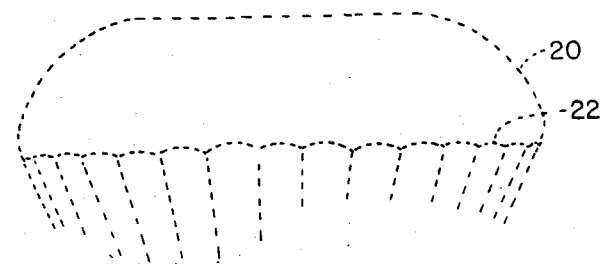
FIG. 2 shows the reefing line buffer cloth encircling a set of parachute suspension lines.

FIG. 1 is the reefing line buffer cloth shown sewn along stitching line 4 to one of a parachute's suspension lines 6. The buffer cloth is made of a heavy cloth material such as cotton duck cloth of 10–12 oz. weight. The buffer cloth's margin 8 should be folded over and stitched so as to reinforce the edge and prevent threads from unraveling. A pocket 12 is sewn onto the buffer cloth 1. This pocket may be a rectangular piece of stretchable webbing material to hold a cylindrical object in place. Alternatively, a similarly shaped metal bracket may be sewn in the place of the pocket 12. Such a bracket would also be designed to hold a cylindrical object in place as shown in FIG. 2. The pocket is centered on one half of the buffer cloth and open at the top and bottom. The buffer cloth 1 is roughly of rectangular shape and is of sufficient width to encircle all the parachutes suspension lines with a minimum ½ inch overlap. A five inch length in the direction of the pocket is sufficient to hold the types of cutters used.

FIG. 2 illustrates the parachute reefing buffer cloth 1 installed on a set of parachute suspension lines 6. A cylindrically shaped cutter 14 is shown retained by pocket 12. A reefing line 16 secures the buffer cloth in place passing through an opening 18 on the cutter. This assembly is placed in a position determined by the degree in which it is desired to initially restrict the opening of the parachute canopy. An outline of a parachute canopy 20 with a periphery 22 is shown in FIG. 2, the suspension lines which extend from the periphery of the canopy being reefed by the operation of this invention. The cutter 14 is a pyrotechnically powered device in which a blade cuts reefing line 16 allowing the reefing buffer cloth to open and the suspension lines to separate in turn leading to the full opening of the parachute. The cutter may include a timing mechanism so that it is actuated at a predetermined time after the parachute and its load are dropped.

The present invention provides for a simplified method of reefing suspension lines. Parachutes so equipped may be easily packed with the reefing device.

I claim:

1. A parachute comprising a canopy having a periphery; a series of suspension lines extending from the periphery; a reefing line buffer cloth encircling said suspension lines, a reefing line encircling and holding said reefing line buffer cloth in place and a cutting means to cut said reefing line at a predetermined time during deployment of said canopy; wherein said cutting means is held in place by a pocket on said reefing line buffer cloth.

2. A parachute as described in claim 1 wherein said cutting means comprises a cylindrically shaped pyrotechnic cutter.

3. A parachute as described in claim 2 wherein said pyrotechnic cutter has an opening, said reefing line passing through said opening.

4. A parachute as described in claim 3, wherein said reefing line buffer cloth comprises a rectangular shaped section of cloth attached securely to one of the suspension lines, said cloth of sufficient width to encircle all of the suspension lines with a minimum ½ inch overlap.

5. A parachute as described in claim 4 wherein said reefing line buffer cloth is made from a cotton duck material of 10–12 oz. per square yard weight.

* * * * *